(12) United States Patent
Long

(10) Patent No.: US 8,812,438 B2
(45) Date of Patent: Aug. 19, 2014

(54) SYSTEM, METHOD AND COMPUTER PROGRAM PRODUCT FOR SYNCHRONIZING DATA USING DATA IDENTIFYING MESSAGES

(71) Applicant: salesforce.com, inc, San Francisco, CA (US)

(72) Inventor: Martin Long, Alameda, CA (US)

(73) Assignee: salesforce.com, inc., San Francisco, CA (US)

( * ) Notice: Subject to any disclaimer, the term of this patent is extended or adjusted under 35 U.S.C. 154(b) by 17 days.

(21) Appl. No.: 13/653,337

(22) Filed: Oct. 16, 2012

(65) Prior Publication Data

US 2013/0191333 A1     Jul. 25, 2013

Related U.S. Application Data

(60) Provisional application No. 61/589,161, filed on Jan. 20, 2012.

(51) Int. Cl.
| | | |
|---|---|---|
| *G06F 17/00* | (2006.01) | |
| *G06F 17/30* | (2006.01) | |
| *H04L 29/08* | (2006.01) | |

(52) U.S. Cl.
CPC ....... *G06F 17/30578* (2013.01); *H04L 29/0854* (2013.01)
USPC ........... 707/613; 707/769; 707/803; 718/101; 718/1

(58) Field of Classification Search
CPC .............. G06Q 30/0202; G06F 17/30313; G06F 12/0875; G06F 12/0886; G06F 17/30345; G06F 17/3053; G06F 17/30283; G06F 17/30578; G06F 17/30067; G06F 17/30008; G06F 11/1471; H04L 29/0854
USPC ........ 707/610, 615, 626, 638, 639, 795, 769, 707/624, 625, 803, 609, 737, 618, E17.045, 707/E17.005, E17.01, E17.014, 613, 707/E17.032; 718/101, 1; 715/738, 769; 709/203, 204, 206, 217, 219

See application file for complete search history.

(56) References Cited

U.S. PATENT DOCUMENTS

| | | |
|---|---|---|
| 5,577,188 A | 11/1996 | Zhu et al. |
| 5,608,872 A | 3/1997 | Schwartz et al. |
| 5,649,104 A | 7/1997 | Carleton et al. |

(Continued)

OTHER PUBLICATIONS

David A. Nichols, Pavel Curtis, Michael Dixon and John Lamping—"High-latency, low-bandwidth windowing in the Jupiter collaboration system"—Proceeding UIST '95 Proceedings of the 8th annual ACM symposium on User interface and software technology—Nov. 14-17, 1995, pp. 111-120.*

(Continued)

*Primary Examiner* — Anh Ly
(74) *Attorney, Agent, or Firm* — Zilka-Kotab, PC

(57) ABSTRACT

In accordance with embodiments, there are provided mechanisms and methods for synchronizing data using data identifying messages. These mechanisms and methods for synchronizing data using data identifying messages can enable embodiments to provide notification of a need to synchronize one instance of data with changes made to another instance of data, without necessarily communicating the changes to be made to the other instance of the data. The ability of embodiments to provide synchronization based on such a notification can allow more efficient data synchronization while ensuring that synchronizations are based on up-to-date information.

15 Claims, 6 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 6,952,741 B1 * | 10/2005 | Bartlett et al. ................. 709/245 |
| 7,062,502 B1 | 6/2006 | Kesler |
| 7,181,758 B1 | 2/2007 | Chan |
| 7,302,466 B1 * | 11/2007 | Satapathy et al. ............ 709/203 |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,039 B2 | 8/2010 | Weissman et al. |
| 7,783,610 B2 * | 8/2010 | Lin et al. ...................... 707/689 |
| 7,788,399 B2 * | 8/2010 | Brouk et al. .................. 709/238 |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,375,081 B2 * | 2/2013 | Feliberti et al. ............... 709/203 |
| 8,406,633 B1 * | 3/2013 | Johnston et al. .............. 398/154 |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0038642 A1 * | 2/2007 | Durgin et al. ................. 707/10 |
| 2007/0088707 A1 * | 4/2007 | Durgin et al. ................. 707/10 |
| 2007/0169081 A1 * | 7/2007 | Zhao et al. .................... 717/168 |
| 2008/0010243 A1 * | 1/2008 | Weissman et al. ............. 707/2 |
| 2008/0082586 A1 * | 4/2008 | Jasik et al. ..................... 707/200 |
| 2008/0249972 A1 | 10/2008 | Dillon |
| 2009/0063415 A1 | 3/2009 | Chatfield et al. |
| 2009/0064147 A1 * | 3/2009 | Beckerle et al. ............... 718/101 |
| 2010/0063959 A1 * | 3/2010 | Doshi et al. ................... 707/618 |
| 2010/0088316 A1 * | 4/2010 | Robinson et al. ............. 707/737 |
| 2010/0095064 A1 * | 4/2010 | Aviles ........................... 711/118 |
| 2010/0100526 A1 * | 4/2010 | Choi et al. ..................... 707/609 |
| 2010/0235322 A1 * | 9/2010 | Kuruganti et al. ............ 707/610 |
| 2010/0306536 A1 * | 12/2010 | Brouk et al. ................... 713/168 |
| 2011/0231848 A1 | 9/2011 | Long et al. |
| 2011/0246503 A1 * | 10/2011 | Bender et al. ................. 707/769 |
| 2012/0089783 A1 * | 4/2012 | Tsirkin et al. ................. 711/125 |
| 2012/0150829 A1 * | 6/2012 | Bourbonnais et al. ........ 707/703 |
| 2012/0191680 A1 * | 7/2012 | Bourbonnais et al. ........ 707/703 |

(56) References Cited

U.S. PATENT DOCUMENTS

| | | | |
|---|---|---|---|
| 2012/0214521 A1* | 8/2012 | Preston et al. | 455/466 |
| 2013/0041888 A1* | 2/2013 | Eisner et al. | 707/722 |
| 2013/0055263 A1* | 2/2013 | King et al. | 718/1 |
| 2013/0066832 A1* | 3/2013 | Sheehan et al. | 707/634 |
| 2013/0191333 A1* | 7/2013 | Long | 707/613 |
| 2013/0346364 A1* | 12/2013 | Ahluwalia et al. | 707/610 |

OTHER PUBLICATIONS

Elena García, Sara Rodríguez, Beatriz Martín, Carolina Zato, and Belén Pérez—"MISIA: Middleware Infrastructure to Simulate Intelligent Agents"—International Symposium on Distributed Computing and Artificial Intelligence Advances in Intelligent and Soft Computing vol. 91, 2011, pp. 107-116.*

* cited by examiner

SYSTEM, METHOD AND COMPUTER PROGRAM PRODUCT FOR SYNCHRONIZING DATA USING DATA IDENTIFYING MESSAGES

CLAIM OF PRIORITY

This application claims the benefit of U.S. Provisional Patent Application No. 61/589,161 entitled "Methods and Systems for Forecasting in an On-Demand Services Environment," by Martin Long, filed Jan. 20, 2012, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data synchronization.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventionally, data synchronization has allowed multiple instances (e.g. copies) of data to be separately maintained, while ensuring that the separate instances are up-to-date with respect to each other. Thus, where one of the instances of the data is updated, the data synchronization may result in a similar update being made to the other instance of the data. Unfortunately, convention techniques for performing data synchronization have exhibited various limitations.

For example, directly communicating to one instance of data each change made to another instance of the data can result in cumbersome use of system resources, particularly when multiple changes to data are regularly being made. Moreover, any delay in receiving the communication by the one instance of data regarding the change made to the other instance of the data may allow an additional change to be made to the one instance of the data before the other instance of the data is updated in accordance with the first change. Thus, in such a situation involving a change being made after the communication regarding a previous change is sent, the communication typically does not result in the instances of the data being synchronized.

Accordingly, it is desirable to provide techniques enabling more efficient data synchronization while ensuring that synchronizations are based on up-to-date information.

BRIEF SUMMARY

In accordance with embodiments, there are provided mechanisms and methods for synchronizing data using data identifying messages. These mechanisms and methods for synchronizing data using data identifying messages can enable embodiments to provide notification of a need to synchronize one instance of data with changes made to another instance of data, without necessarily communicating the changes to be made to the other instance of the data. The ability of embodiments to provide synchronization based on such a notification can allow more efficient data synchronization while ensuring that synchronizations are based on up-to-date information.

In an embodiment and by way of example, a method for synchronizing data using data identifying messages is provided. In use, an update made to a first instance of data stored in a first data set is identified. Additionally, a message having an identifier of the first instance of the data to which the update was made is generated. Further, a state of the first instance of the data stored in the first data set is identified using the identifier included in the message. Moreover, the state of the first instance of the data stored in the first data set is compared to a state of a second instance of the data stored in a second data set. Still yet, the second instance of the data stored in the second data set and the first instance of the data stored in the first data set are synchronized, based on the comparison.

While one or more implementations and techniques are described with reference to an embodiment in which synchronizing data using data identifying messages is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are pr vided for synchronizing data using data identifying messages.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing synchronizing data using data identifying messages will be described with reference to example embodiments.

Figure 1:
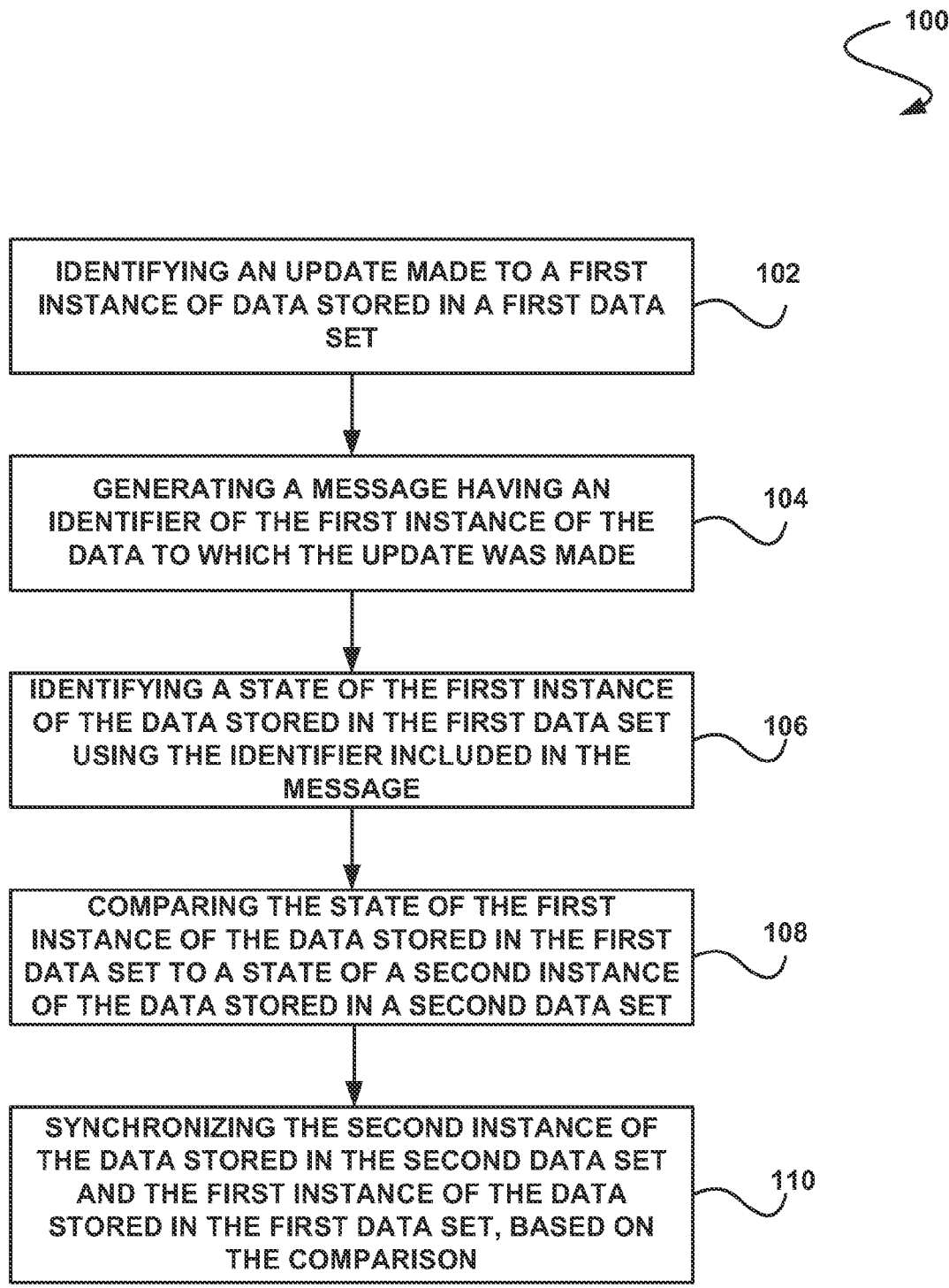
FIG. 1 illustrates a method for synchronizing data using data identifying messages in accordance with an embodiment.

FIG. 1 illustrates a method 100 for synchronizing data using data identifying messages in accordance with an embodiment. As shown in operation 102, an update made to a first instance of data stored in a first data set is identified. In the context of the present description, the first data set includes any data set that is separate from a second set data, such that the first instance of the data stored in the first data set is separate from a second instance of the data stored in the second data set, as described in more detail below. Such separation may be a physical separation (e.g. by the data sets being stored on different servers, etc.) or a logical separation (e.g. by the data sets being stored in separate portions of the same memory).

For example, the first data set may be source data, such that the first instance of the data is a portion of the source data. Such source data may be accessible to a user for making the update to the first instance of the data. Thus, the update may be manually made to the first instance of the data, in one embodiment, by the user accessing the first instance of the data. Of course, in other embodiments the update may be automatically made to the first instance of the data, for example, by an application, code, etc. being executed to make the update to the first instance of the data.

Further, the second data set mentioned above may be target data, such that the second instance of the data is a portion of the target data. Such target data may not necessarily be accessible to a user/application for updating the same, with the exception of updates made to the target data in accordance with the synchronization described with respect to the present method 100. Just by way of example, in the present method 100 the second data set may replicate the first data set by synchronizing the second data set with the first data set in the manner described below.

As an option, the second data set may store a processed version of the first data set. In one embodiment, the processing may include changing a granularity of the first data set. For example, the first data set may store the data in terms of that are more granular or less granular than the terms by which the data is stored in the second data set. In another embodiment, the processing may include normalizing a plurality of different types of data included in the first data set into a common format. In this way, the second data set may store all data in the common format. In yet another embodiment, the processing may include removing a portion of the first data set. Accordingly, the second data set may not necessarily be an exact copy of the first data set, but may be representation of the first data set that is formed in accordance with predefined configurations.

It should be noted that the second data set may be utilized for any desired purpose. In one embodiment, the second data set may be utilized for generating reports, such as forecasts. Accordingly, the aforementioned processing of the data prior to storing the same in the second data set may be performed to allow for more efficient generation of reports using the second data set. Just by way of example, the second data set may store the data with a granularity that is utilized by a report generator, such that generation of a report does not necessarily require on-the-fly processing of the data to ensure that it is of the granularity required by the report. As another example, the second data set may store the data in a common format, regardless of a type of the data, such that generation of a report does not necessarily require on-the-fly processing of the data to ensure that it is of the format required by the report. More information regarding the exemplary embodiment where the second data set is utilized for generating forecasts is described in U.S. Patent Publication No. 2011/0231848, entitled "FORECASTING SYSTEMS AND METHODS," by Long et al., filed Mar. 16, 2011, the entire contents of which are incorporated herein by reference.

To this end, both a first instance of the data and a second instance of the data are stored in separate data sets. As shown in operation 104, a message having an identifier of the first instance of the data to which the update was made is generated. Such message may optionally be automatically generated in response to the update being made to the first instance of the data.

In one embodiment, the message may include only the identifier of the first instance of the data to which the update was made. Such identifier may uniquely identify at least the first instance of the data. As another option, the identifier may uniquely identify the data, including the first instance of the data and the second instance of the data. For example, the identifier may be stored (e.g. as a key, etc.) in association with the first instance of the data and optionally the second instance of the data.

The identifier may be automatically generated and stored in association with the first instance of the data upon a first creation, saving, etc. of the first instance of the data. Just by way of example, the identifier may be included in a record storing the first instance of the data. Thus, when generating the message, the identifier may be determined from the first instance of the data that has been updated.

It should be noted that the message may be of any desired format capable of communicating the identifier of the first instance of the data to which the update was made. The message format may be predetermined for use with an application utilized for synchronizing the second data set with the first data set. For example, the format of the message may be such that the application is capable of parsing, reading, etc. the identifier of the first instance of the data included therein, the reasons for which are set forth below in more detail.

As an option (not shown), upon generation of the message, the message may be stored in a message queue. The message queue may store all messages generated in response to an update to the first data set. Synchronization between the first data set and the second data set may then only be initiated upon retrieval of the message from the message queue. In this way, there may optionally be delay between the update made to the first instance of the data stored in the first data set and a processing of the message for conditionally initiating the synchronization of the second data set with the first data set. As another option, the message may be communicated directly to the application for use in conditionally initiating the synchronization of the second data set with the first data set.

Further, as shown in operation 106, a state of the first instance of the data stored in the first data set is identified using the identifier included in the message. Optionally, where the message is stored in the message queue, the state of the first instance of the data may be identified in response to retrieving the message from the message queue. In particular, the identifier of the first instance of the data may be retrieved from the message (e.g. obtained from the message queue) for use in identifying the state of the first instance of the data stored in the first data set. Such message may be parsed, or processed in any other manner for retrieving the identifier of the first instance of the data included therein.

In one embodiment, the identifier included in the message may be used to identify the state of the first instance of the data by locating the first instance of the data within the first data set using the identifier included in the message. The state of the located first instance of the data may then be identified. The first instance of the data may be located within the first data set by querying the first data set using the identifier included in the message, just by way of example.

In the context of the present description, the state of the first instance of the data may be any status, version, etc. of the first instance of the data stored in the first data set. For example, the state of the first instance of the data may be data values included in the first instance of the data. It should be noted that since the state of the first instance of the data is identified after the update has been made to the first instance of the data, and is specifically identified using the identifier of the first instance of the data included in the message generated in response to the update made to the first instance of the data, the identified state of the first instance of the data may reflect the update made to the first instance of the data.

Moreover, since the state of the first instance of the data is identified (e.g. directly from the first data set) using the identifier of the first instance of the data included in the message, the identified state of the first instance of the data may be a current state of the first instance of the data stored in the first data set. For example, if any other updates are made to the first instance of the data during the time period between the generation of the message and the identification of the state of the first instance of the data, the identified state of the first instance of the data may reflect those other updates.

Moreover, the state of the first instance of the data stored in the first data set is compared to a state of the second instance of the data stored in the second data set, as shown in operation 108. In the present description, the state of a second instance of the data stored in the second data set may be any status, version, etc. of the second instance of the data stored in the second data set. For example, the state of the second instance of the data may be data values included in the second instance of the data.

In one embodiment, the state of the second instance of the data stored in the second data set may be identified using the identifier included in the message. For example, as noted above, the second instance of the data may optionally be stored in the second data set in association with the same identifier stored in the first data set in association with the first instance of the data. Accordingly, the identifier included in the message may be used to identify the state of the second instance of the data by locating the second instance of the data within the second data set using the identifier included in the message and identifying the state of the located second instance of the data. Of course, it should be noted that the state of the second instance of the data stored in the second data set may be identified in any manner that is associated with the identification of the state of the first instance of the data in the first data set.

Additionally, it should be noted that since the state of the second instance of the data is identified after the update has been made to the first instance of the data, and is specifically identified using the identifier of the first instance of the data included in the message generated in response to the update made to the first instance of the data, the identified state of the second instance of the data may not necessarily reflect the update made to the first instance of the data. For example, the second instance of the data may not have been synchronized with the first instance of the data to allow the second instance of the data to reflect the update made to the first instance of the data.

Moreover, since the state of the second instance of the data is identified (e.g. directly from the second data set) using the identifier of the included in the message, the identified state of the second instance of the data may be a current state of the second instance of the data stored in the second data set. Thus, the state of the second instance of the data that is identified may reflect any previous synchronizations performed between the second instance of the data and the first instance of the data. This may even include the state of the second instance of the data already reflecting the update made to the first instance of the data in operation 102, such as for example when a previous synchronization between the first instance of the data already having the update and the second instance of the data is performed per a message previously generated in response to a previous update to the first instance of the data.

Still yet, as shown in operation 110, the second instance of the data stored in the second data set and the first instance of the data stored in the first data set are synchronized, based on the comparison. In the present embodiment, synchronizing the second instance of the data stored in the second data set and the first instance of the data stored in the first data set may be include updating the second instance of the data stored in the second data set to replicate the first instance of the data stored in the first data set. Of course, such update to the second instance of the data may be processed, as described above, such that the updated second instance of the data is in a preconfigured format (e.g. granularity, etc.).

In one embodiment, the second instance of the data stored in the second data set may be synchronized with the first instance of the data stored in the first data set in response to a result of the comparison indicating that the first instance of the data is different than the second instance of the data. In another embodiment, the second instance of the data stored in the second data set may be prevented from being synchronized with the first instance of the data stored in the first data set in response to a result of the comparison indicating that the first instance of the data is the same as the second instance of the data.

By synchronizing the first instance of the data and the second instance of the data in the manner described above, namely using the identifier of the first instance of the data included in a message prompting the synchronization, a notification of a possible need to synchronize the second instance of the data with changes made to the first instance of the data may be provided, without necessarily communicating the actual changes that are potentially to be made to the second instance of the data. This may allow more efficient data synchronization (e.g. with one message per update to the first instance of the data, etc.) while ensuring that synchronizations are conditionally performed based on up-to-date information (e.g. current states of the first instance of the data and the second instance of the data).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
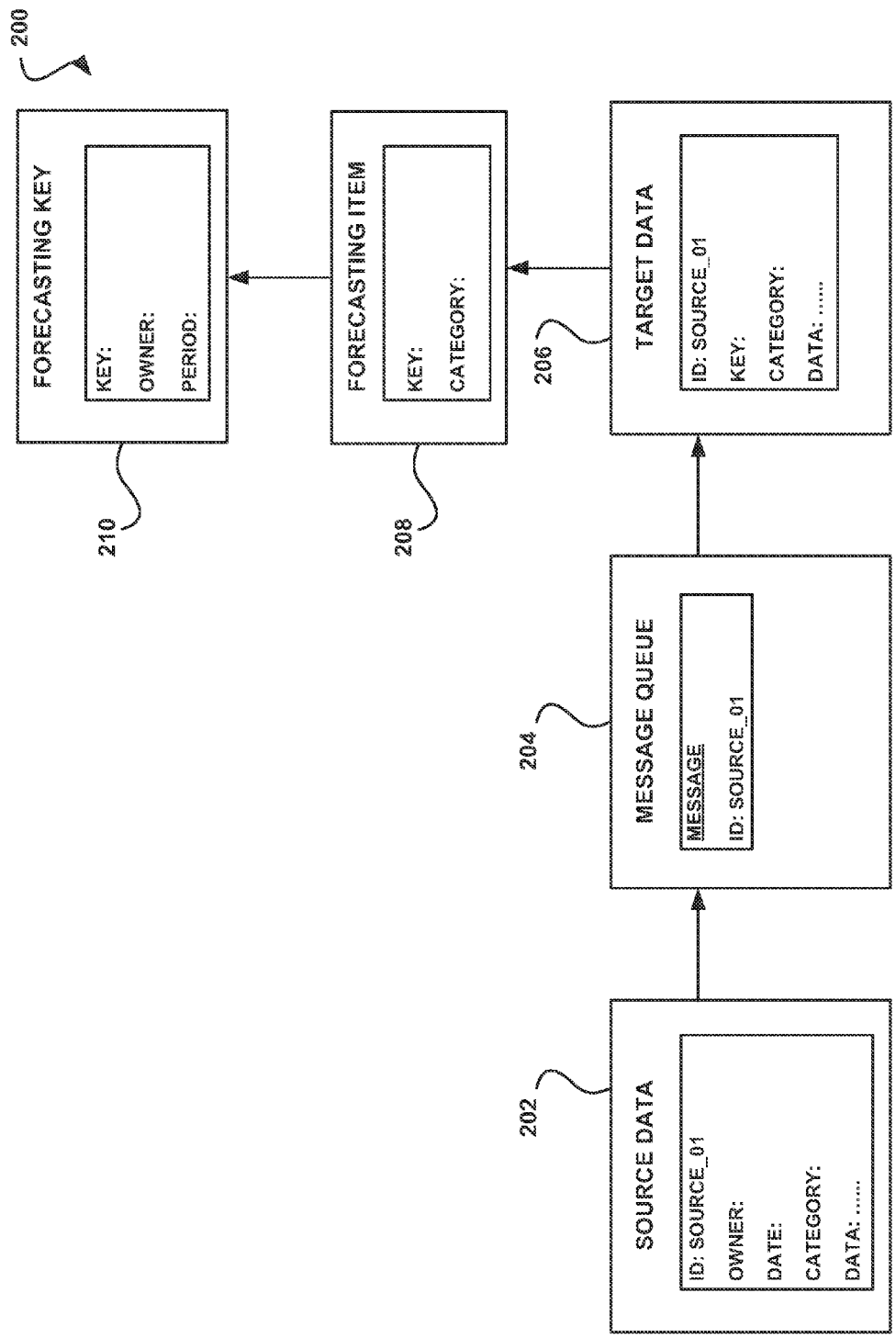
FIG. 2 illustrates a system for synchronizing data in a forecasting environment using data identifying messages in accordance with an embodiment.

FIG. 2 illustrates a system 200 for synchronizing data in a forecasting environment using data identifying messages in accordance with an embodiment. As an option, the present system 200 may be implemented to carry out the method 100 of FIG. 1. Of course, however, the system 200 may be implemented in any desired environment. It should also be noted that the aforementioned definitions may apply during the present description.

As shown, the system 200 stores both source data 202 and target data 206, where the target data 206 replicates the source data 202 for use in generating a forecast. In the present embodiment, the system 200 may be any computer system capable of storing and synchronizing the source data 202 and the target data 206, for use in generating forecasts. For example, the system 200 may be a multi-tenant on-demand database system storing the source data 202 and the target data 206 for tenants of the system 200. It should be noted that while forecasts are described with respect to the present system 200, the system 200 may store the source data 202 and the target data 206 for any desired purpose (e.g. reporting, etc.).

In use, a first instance of data included in the source data 202 is updated (e.g. by a user). The first instance of the data may be stored in a record included in the source data 202, for example. In the embodiment shown, the first instance of the data includes an identifier of the first instance of the data (SOURCE_01), an identifier of an owner (OWNER) of the first instance of the data (e.g. a tenant on behalf of which the first instance of the data is stored), a date (DATE) associated with the first instance of the data, an identifier of a category (CATEGORY) of the first instance of the data, and the actual data (DATA) comprising the first instance of the data.

In response to the update, a message is generated that includes the identifier of the first instance of the data (SOURCE_01). The generated message is communicated to and stored in a message queue 204. Subsequently, the message is retrieved from the message queue 204. The retrieval may occur in accordance with a periodic process, available processing resources, etc.

Once the message is retrieved from the message queue 204, a second instance of the data stored in the target data 206 is conditionally synchronized with the first instance of the data stored in the source data 202. The second instance of the data may be stored in a record included in the target data 206, for example. The second instance of the data may be a processed version of the first instance of the data, as an option. Thus, the second instance of the data may only be a reflection of a state of the first instance of the data, in accordance with a preconfigured format. In the embodiment shown, the second instance of the data includes the identifier of the first instance of the data (SOURCE_01), a key (KEY) to an aggregate (or other report, etc.) that has been formed based on the second instance of the data, a an identifier of a category (CATEGORY) of the second instance of the data, and the actual data (DATA) comprising the second instance of the data.

In the present embodiment, the identifier (SOURCE_01) included in the message is retrieved from the message and used to locate the first instance of the data with which the identifier is associated in the source data 202. A state of the located first instance of the data is then identified. Additionally, the identifier (SOURCE_01) retrieved from the message is used to locate the second instance of the data with which the identifier is associated in the target data 206, such that a state of the located second instance of the data is then identified. The state of the first instance of the data is compared with the state of the second instance of the data, and the second instance of the data is conditionally synchronized based on the comparison. For example, if it is determined that the first instance of the data and the second instance of the data match, the synchronization of the second instance of the data with the first instance of the data is avoided.

If, however, it is determined that the first instance of the data and the second instance of the data do not match, the second instance of the data is synchronized with the first instance of the data. In this way, the second instance of the data may be updated to reflect the update made to the first instance of the data. In one exemplary embodiment, the synchronization may include processing the state of the first instance of the data and storing a result of the processing as the second instance of the data. Thus, the second instance of the data may reflect the current state of the first instance of the data, in accordance with a preconfigured format.

Furthermore, any previously generated reports, forecasts, aggregates, etc. relying on the updated second instance of the data stored in the target data 206 may also be updated. For example, in the embodiment shown, the system 208 relates to a forecasting system in which a forecasting item 208 is stored having the key (KEY) to the second instance of the data and stores an identifier of a category (CATEGORY). The forecasting item 208 represents an aggregate of the target data 206 that is generated in accordance with a forecasting key 210 stored by the system 200. The forecasting key 210 includes the key (KEY), owner (OWNER), and time period (PERIOD) forming the basis for the aggregation represented by the forecasting item 208. Thus, the aggregate may combine portions of the target data 206 based on the time period (PERIOD), such that the portions of the target data 206 included in the aggregate defined may only be associated with a date (DATE) included in the specified period (PERIOD).

When the second instance of the data is updated to include a new data value (e.g. revenue data, etc.), the aggregate may be updated to reflect the new data value. When the second instance of the data is updated to associate a data value included therein with a new date (DATE), the aggregate may be updated to either (1) include the data value in the aggregate when the new date falls within the time period (PERIOD) specific to the aggregate, or (2) remove the data value from the aggregate when the new date falls outside of the time period (PERIOD) specific to the aggregate. Various examples of updating forecasts (e.g. aggregates) in response to an update to target data 206 is described in U.S. Patent Publication No. 2011/0231848, entitled "FORECASTING SYSTEMS AND METHODS." by Long et al., filed Mar. 16, 2011, the entire contents of which are incorporated herein by reference.

In one exemplary embodiment, a user may update the first instance of the data stored in the source data 202 to specifically update a data value (DATA) of the first instance of the data from $1,000 to $1,500. At the time of the update, the second instance of the data stored in the target data 206 may include the original $1.000 data value, per a previous synchronization of the second instance of the data with the first instance of the data prior to the update being made to the first instance of the data.

A message is generated in response to the update, where the message is generated to include the identifier of the first instance of the data. The message is then stored in the message queue 204. At a later time, the message is retrieved from the message queue 204, and the identifier therein is used to identify (i.e. read) a state of the first instance of the data and a state of the second instance of the data. The state of the first instance of the data is compared with the state of the second instance of the data, and as a result of the comparison it is determined that the state of the first instance of the data (source data value=$1,500) does not match the state of the second instance of the data (target data value=$1,000). In response, the second instance of the data is updated such that the data value of the second instance of the data reflects the update made to the first instance of the data (i.e. target data value=$1,500).

As an option, locks may be used to avoid race conditions. In particular, the locks may be used since it is unknown which data is to be locked at the time the message is being retrieved from the message queue 204. When the message is dequeued, the first instance of the data stored in the source data 202 may be read tentatively (e.g. unsafely) to identify the state thereof, then the state of the second instance of the data may be determined and compared to the state of the first instance of the data. If the states do not match, the forecasting item 208 and the second instance of the data stored in the target data 206 are locked, and once those locks are in place the first instance of the data stored in the source data 202 is again read (e.g. safely) to determine whether the states still do not match. If the states still do not match, the second instance of the data is updated accordingly to reflect the first instance of the data, and furthermore, the forecasting item 208 is updated to reflect the change made to the target data 206. After the updates to the second instance of the data and the forecasting item 208 are committed, the locks are removed.

Figure 3A:
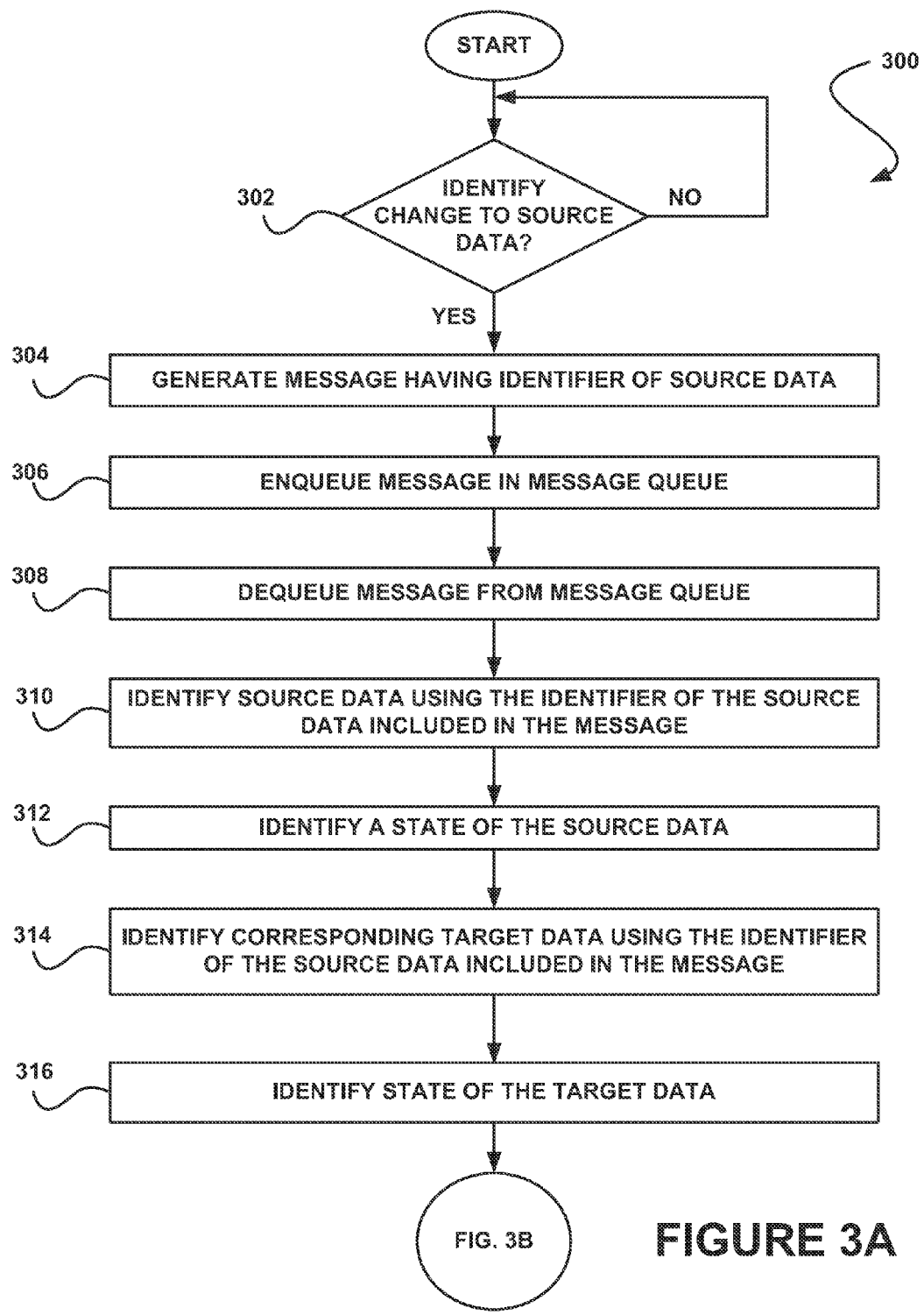
FIGS. 3A-3B illustrate a method for conditionally synchronizing source and target data using a single identifier of the data in accordance with an embodiment.
Figure 3B:
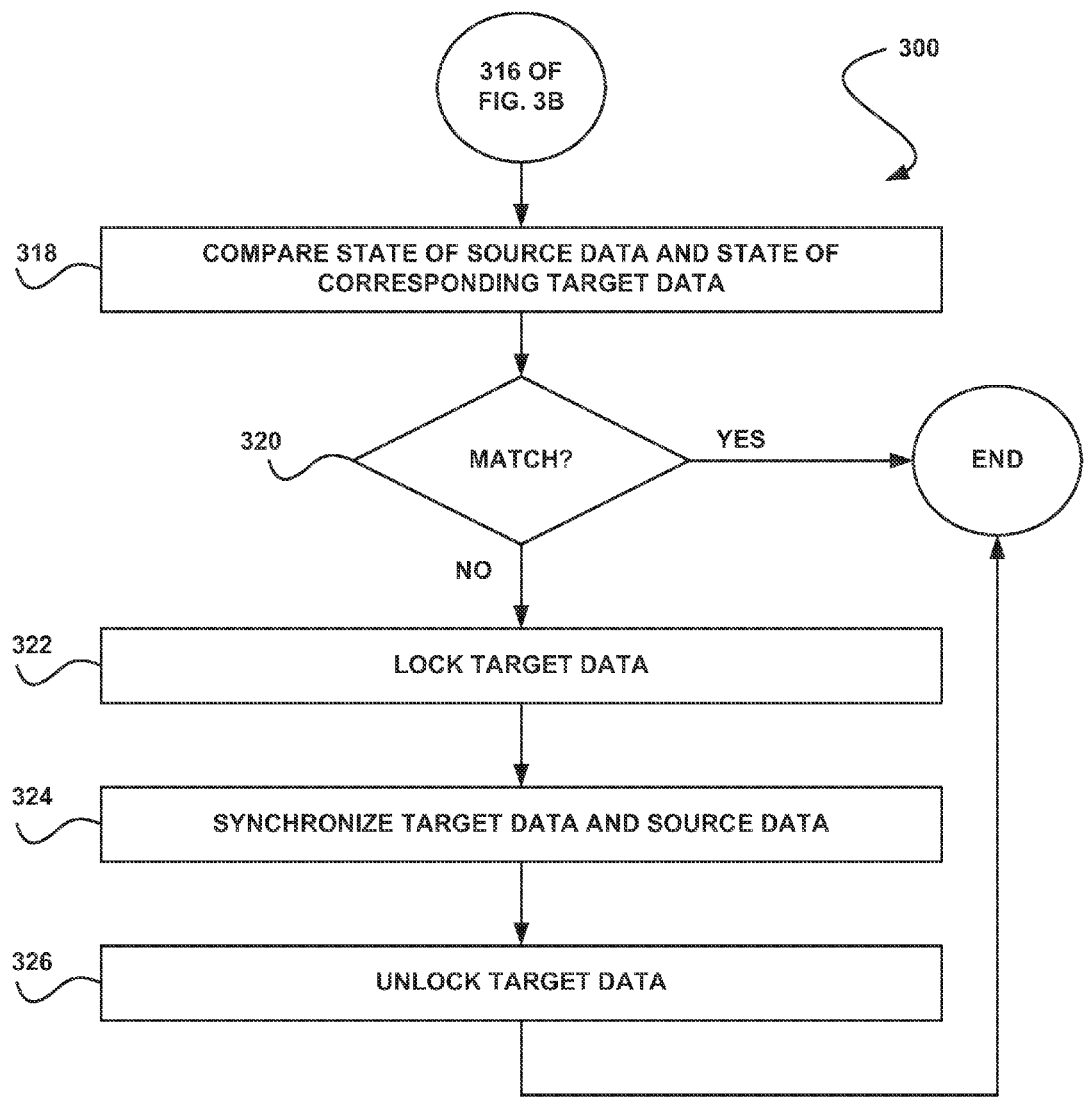

FIGS. 3A-3B illustrate a method 300 for conditionally synchronizing source and target data using a single identifier of the data in accordance with an embodiment. As an option, the method 300 may be carried out in the context of FIGS. 1-2. Of course, however, the method 300 may be carried out in any desired environment. It should also be noted that the aforementioned definitions may apply during the present description.

As shown in decision 302, it is determined whether a change to source data has been made. If it is determined that a change to source data has not been made, the method 300 continues to wait for such a change to be made. Once it is determined that a change to source data has been made, a message having an identifier of the source data is generated. Note operation 304.

In addition, the message is enqueued in a message queue, as shown in operation 306. At some time later, the message is dequeued from the message queue (operation 308), and the source data is identified using the identifier of the source data included in the message (operation 310). Further, as shown in operation 312, a state of the source data is identified, in response to the identification of the source data. Corresponding target data is then identified using the identifier of the source data included in the message (operation 314), and a state of the target data is then identified (operation 316).

The state of the source data and the state of the target data are compared, as shown in operation 318. Based on the comparison, it is determined whether the source data and the target data match, as shown in decision 320. If it is determined that the source data and the target data match, the method 300 terminates. If, however, it is determined that the source data and the target data do not match, the target data is locked (operation 322) and synchronized with the source data (operation 324). Once the synchronization is complete, the target data is unlocked, as shown in operation 326, and the method 300 terminates.

System Overview

Figure 4:
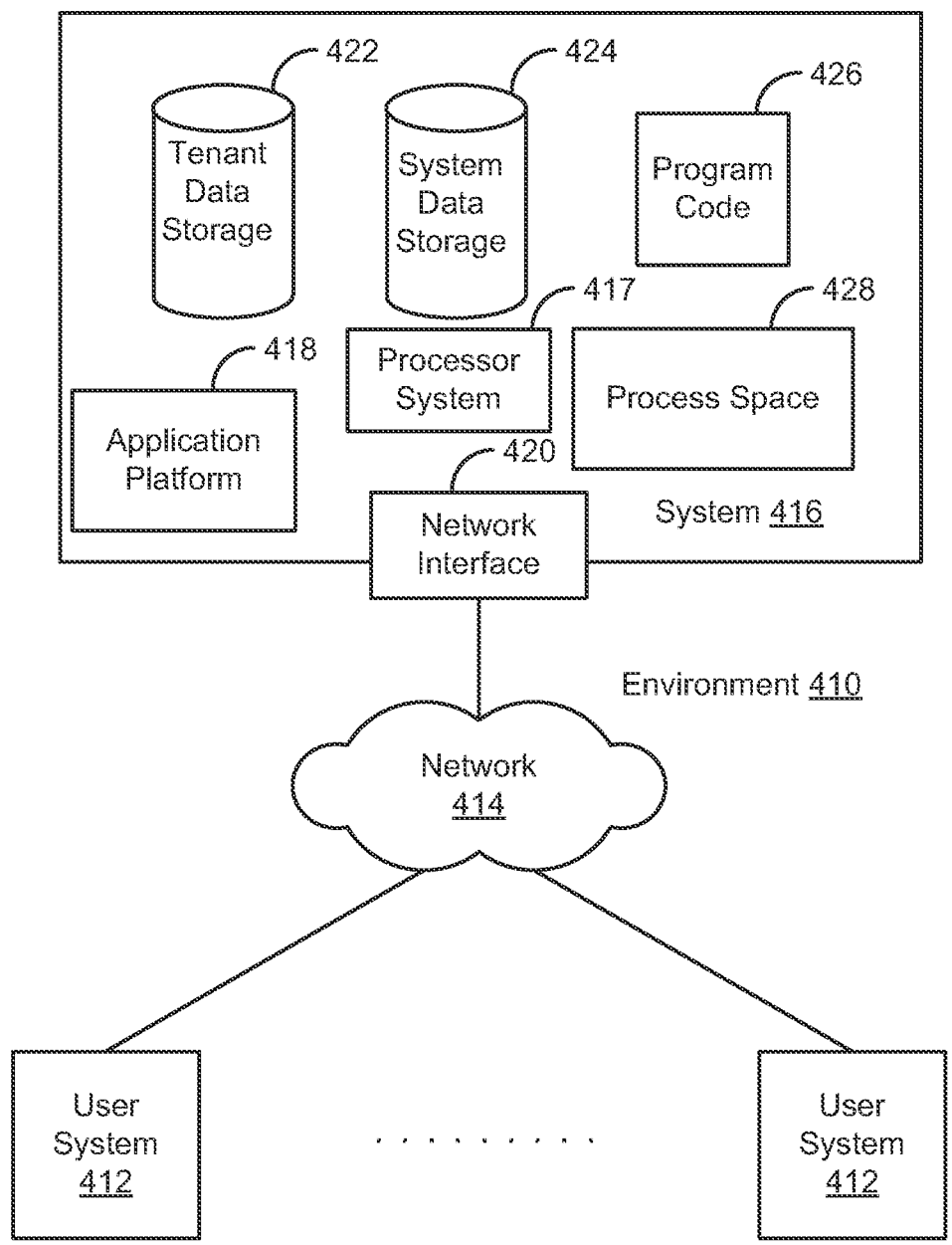
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application (s) including computer code to run using a central processing unit such as processor system 417, which may include an Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
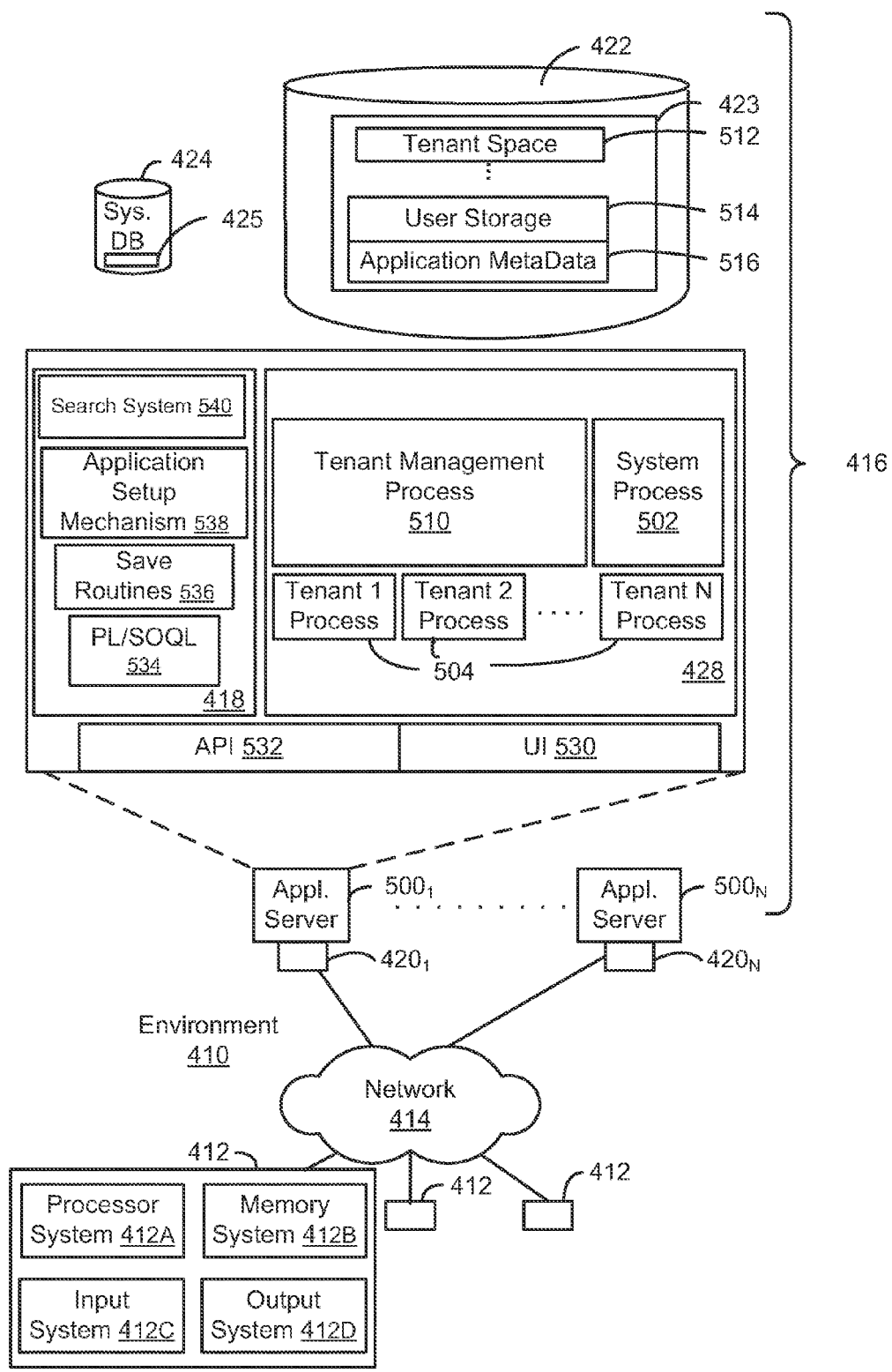
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MUD items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478, entitled "METHOD AND SYSTEM FOR ALLOWING ACCESS TO DEVELOPED APPLICATIONS VIA A MULTI-TENANT ON-DEMAND DATABASE SERVICE," issued Jun. 1, 2010 to Craig Weissman, hereby incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different, network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "CUSTOM ENTITIES AND FIELDS IN A MULTI-TENANT DATABASE SYSTEM", issued Aug. 27, 2010 to Craig Weissman, and hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory machine-readable storage medium having a computer readable program code embodied therein, the computer readable program code adapted to be executed to cause a computer to implement a method, the method comprising:
   identifying an update made to a first instance of data stored in a first data set;
   generating a message having an identifier that uniquely identifies the first instance of the data to which the update was made as well as a second instance of the data stored in a second data set;
   storing the message in a message queue;
   retrieving the message from the message queue;
   locating the first instance of the data within the first data set, using the identifier included in the message retrieved from the message queue;
   identifying a state of the located first instance of the data stored in the first data set;
   locating the second instance of the data within the second data set, using the identifier included in the message retrieved from the message queue;
   identifying a state of the located second instance of the data stored in the second data set;
   comparing the state of the first instance of the data stored in the first data set to the state of the second instance of the data stored in the second data set; and
   synchronizing the second instance of the data stored in the second data set and the first instance of the data stored in the first data set, based on the comparison.

2. The computer program product of claim 1, wherein the first data set is source data accessible to a user, such that the first instance of the data is a portion of the source data that is accessible to the user.

3. The computer program product of claim 2, wherein the update is made to the first instance of the data by the user accessing the first instance of the data.

4. The computer program product of claim 1, wherein the second data set is target data that replicates the first data set by synchronizing the second data set with the first data set.

5. The computer program product of claim 1, wherein the second data set stores a processed version of the first data set.

6. The computer program product of claim 5, wherein the processing includes one or more of changing a granularity of the first data set and normalizing a plurality of different types of data included in the first data set into a common format.

7. The computer program product of claim 1, wherein the second data set is utilized for generating reports.

8. The computer program product of claim 1, wherein the message includes only the identifier of the first instance of the data to which the update was made and is generated in response to the update made to the first instance of the data.

9. The computer program product of claim 1, wherein the state of the first instance of the data includes data values included in the first instance of the data.

10. The computer program product of claim 1, wherein the identifier included in the message is utilized such that the state of the first instance of the data that is identified is a current state of the first instance of the data.

11. The computer program product of claim 1, wherein the second instance of the data stored in the second data set is synchronized with the first instance of the data stored in the first data set in response to a result of the comparison indicating that the first instance of the data is different than the second instance of the data.

12. The computer program product of claim 1, wherein the second instance of the data stored in the second data set is prevented from being synchronized with the first instance of the data stored in the first data set in response to a result of the comparison indicating that the first instance of the data is the same as the second instance of the data.

13. A method, comprising:
identifying an update made to a first instance of data stored in a first data set;
generating a message having an identifier that uniquely identifies the first instance of the data to which the update was made as well as a second instance of the data stored in a second data set, utilizing a processor;
storing the message in a message queue;
retrieving the message from the message queue;
locating the first instance of the data within the first data set, using the identifier included in the message retrieved from the message queue;
identifying a state of the located first instance of the data stored in the first data set;
locating the second instance of the data within the second data set, using the identifier included in the message retrieved from the message queue;
identifying a state of the located second instance of the data stored in the second data set;
comparing the state of the first instance of the data stored in the first data set to the state of the second instance of the data stored in the second data set; and
synchronizing the second instance of the data stored in the second data set and the first instance of the data stored in the first data set, based on the comparison.

14. An apparatus, comprising:
a processor for:
identifying an update made to a first instance of data stored in a first data set;
generating a message having an identifier that uniquely identifies the first instance of the data to which the update was made as well as a second instance of the data stored in a second data set;
storing the message in a message queue;
retrieving the message from the message queue;
locating the first instance of the data within the first data set, using the identifier included in the message retrieved from the message queue;
identifying a state of the located first instance of the data stored in the first data set;
locating the second instance of the data within the second data set, using the identifier included in the message retrieved from the message queue;
identifying a state of the located second instance of the data stored in the second data set;
comparing the state of the first instance of the data stored in the first data set to the state of the second instance of the data stored in the second data set; and
synchronizing the second instance of the data stored in the second data set and the first instance of the data stored in the first data set, based on the comparison.

15. A method for transmitting code, comprising:
utilizing a processor, transmitting code for identifying an update made to a first instance of data stored in a first data set;
transmitting code for generating a message having an identifier that uniquely identifies the first instance of the data to which the update was made as well as a second instance of the data stored in a second data set;
transmitting code for storing the message in a message queue;
transmitting code for retrieving the message from the message queue;
transmitting code for locating the first instance of the data within the first data set, using the identifier included in the message retrieved from the message queue;
transmitting code for identifying a state of the located first instance of the data stored in the first data set;
transmitting code for locating the second instance of the data within the second data set, using the identifier included in the message retrieved from the message queue;
transmitting code for identifying a state of the located second instance of the data stored in the second data set;
transmitting code for comparing the state of the first instance of the data stored in the first data set to the state of the second instance of the data stored in the second data set; and
transmitting code for synchronizing the second instance of the data stored in the second data set and the first instance of the data stored in the first data set, based on the comparison.

* * * * *